April 28, 1925.

Re. 16,055

E. H. SCHOFIELD

COTTON PICKING MACHINE

Original Filed April 6, 1911 2 Sheets-Sheet 1

INVENTOR.

*Eugene H. Schofield, deceased,*

*By Trustees of the Interstate Cotton Pickers. Assignees.*

*By Owen, Owen & Crampton*

*Attys.*

April 28, 1925. Re. 16,055

E. H. SCHOFIELD

COTTON PICKING MACHINE

Original Filed April 6, 1911 2 Sheets-Sheet 2

INVENTOR.

Eugene H. Schofield, deceased,
By Trustees of the Interstate Cotton Pickers.
Assignees.
By Owen, Owen & Crampton
Attys.

Reissued Apr. 28, 1925. Re. 16,055

UNITED STATES PATENT OFFICE.

EUGENE H. SCHOFIELD, DECEASED; BY TRUSTEES OF THE INTERSTATE COTTON PICKERS, OF TOLEDO, OHIO, ASSIGNEES.

COTTON-PICKING MACHINE.

Original No. 1,130,847, dated March 9, 1915, Serial No. 619,255, filed April 6, 1911. Application for reissue filed January 26, 1924. Serial No. 688,899.

*To all whom it may concern:*

Be it known that the TRUSTEES OF THE INTERSTATE COTTON PICKERS, having a place of business in the city of Toledo and county of Lucas and State of Ohio, assignees of the entire interest in the Invention Appertaining to Cotton-Picking Machines, made by EUGENE H. SCHOFIELD, do hereby declare by its president, ALLEN P. TALLMAN, and M. A. LILES, its secretary, the following to be a full, clear, and exact description of the invention, such as will enable others skilled in the art to which it appertains to make and use the same, reference being had to the accompanying drawings and to the characters of reference marked thereon, which form a part of this specification.

This invention relates to improvements in cotton picking machines and has for one of its objects the provision of an improved machine of this class adapted to traverse the field of cotton without injury to the plants and remove the bolls of cotton efficiently and quickly without injuring the seed; a further object being the provision of an improved machine of this class having means whereby dust and foreign matter may be automatically separated from the cotton previous to storing or depositing cotton in sacks or other receptacles.

A further object is to provide an improved form of picking nozzle.

A further object is the provision of an improved machine of this class which will be of simple, durable and cheap construction with the parts compactly arranged and in which the picking nozzle may be readily manipulated.

To the attainment of these ends and the accomplishment of other new and useful objects, as will appear, the invention consists substantially in the features of novelty hereinafter more fully described and claimed and shown in the accompanying drawings exemplifying the invention, and in which,—

Figure 1:
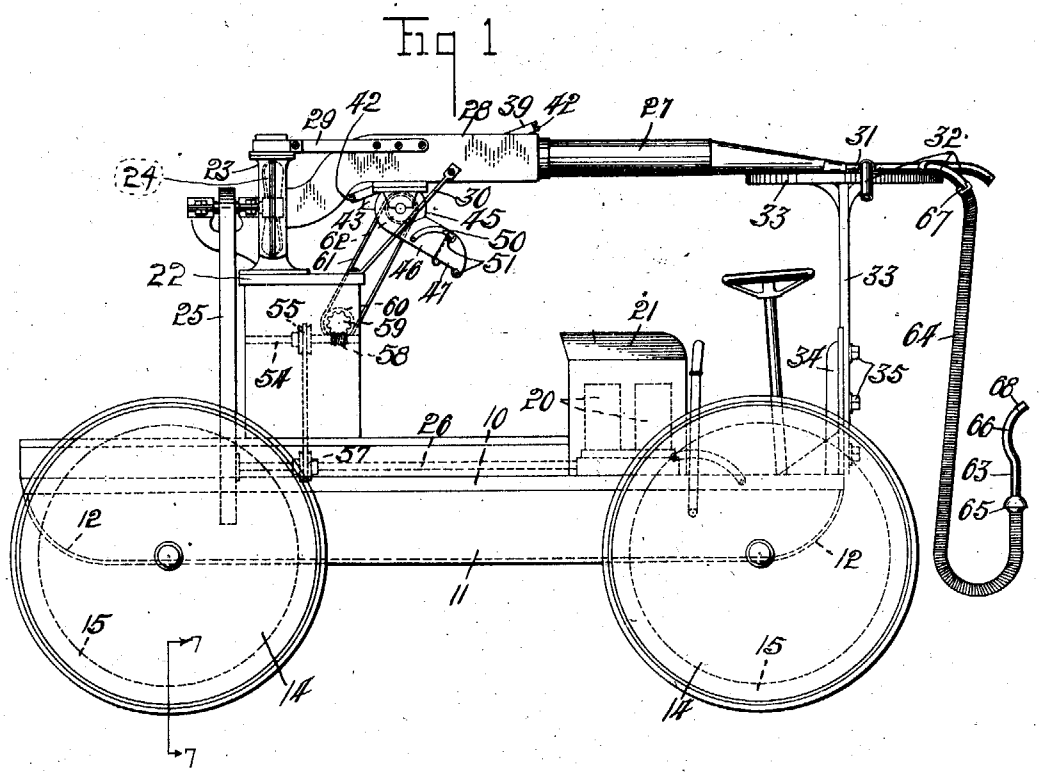
Figure 2:
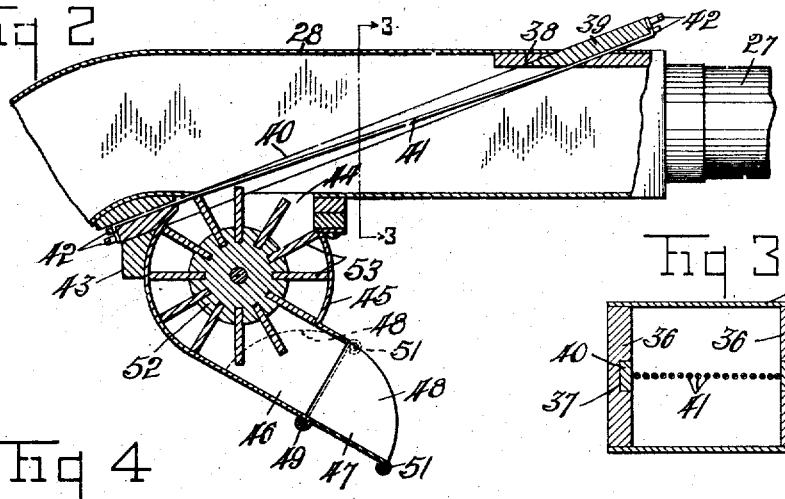
Figure 3:
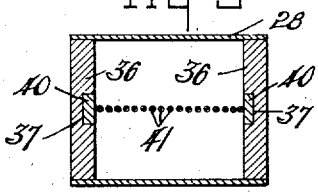
Figure 4:
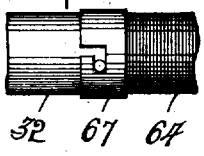
Figure 5:
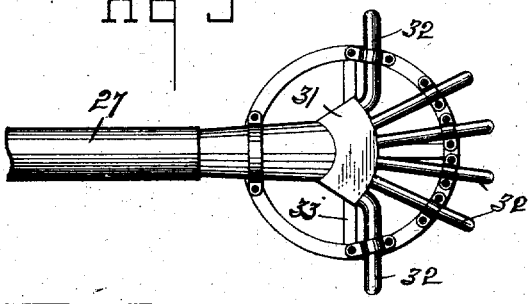
Figure 6:
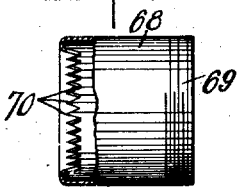
Figure 7:
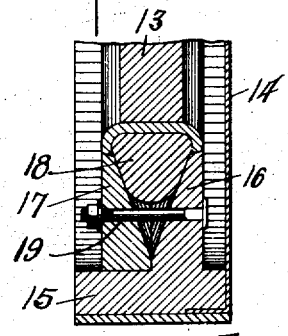

Fig. 1 is a side elevation of an improved machine of this class constructed in accordance with the principles of this invention. Fig. 2 is an enlarged detail sectional view of a portion of the conduit and separator. Fig. 3 is a detail sectional view on line 3—3, Fig. 2. Fig. 4 is an enlarged detail view of the joint between the flexible pipes to which the nozzles are connected, and the conduit. Fig. 5 is a detail top plan view of the manifold to which a plurality of nozzles are connected. Fig. 6 is a detail view partly in elevation and partly in section of one of the picking nozzles. Fig. 7 is an enlarged detail sectional view on line 7—7, Fig. 1.

Referring more particularly to the drawings and in the present exemplification of the invention, the numeral 10 designates generally the body of the vehicle upon which the mechanism is supported and is preferably in the form of a wagon having its bottom 11 constructed of smooth sheet material such as metal which passes under the axles, with its ends curved upwardly as at 12 so that the bottom of the vehicle will pass over the cotton row without injury. The wheels 13 (see Fig. 7) may be of any desired diameter and in order that they may present a smooth surface to the cotton row on each side as the vehicle passes along, thereby obviating all danger of the wheels causing damage to the plant, they are provided with shields 14, constructed of sheet material preferably metal, and these shields are secured to an annular member 15 adapted to surround the periphery of the wheels 13. The annular member 15 is provided with an inwardly projecting portion 16 and cooperating with this portion 16 is an annular member 17, between which member and the portion 16 the tire 18 of the wheel is adapted to be clamped by means of any suitable fastening devices 19 such as bolts or the like. This annular member or rim 15 may be of any desired diameter so that the diameter of the wheels may be increased to any desired size thereby causing a greater clearance under the vehicle to suit the conditions in the different parts of the cotton belt.

The vehicle may be propelled in any desired or suitable manner but is preferably of the motor type having the motor or engine diagrammatically illustrated as at 20 and this motor is preferably located under the seat 21 of the vehicle. Power is imparted from the motor 20 to the wheels of the vehicle in any desired or suitable manner, not necessary to illustrate.

Supported by the vehicle and preferably mounted upon a base or standard 22 is a fan casing 23 in which is located a fan 24 preferably arranged to operate an exhaust or suction fan. The shaft of this fan preferably projects beyond the casing and a driving belt 25 passes over a pulley secured to the shaft and also over another pulley secured to the operating shaft 26 of the motor 20 so that motion will be imparted to the fan 24 from the motor 20.

Leading to the fan casing 23 is a conduit 27, one extremity of which terminates in a separator 28 which latter may be supported in any suitable manner, preferably by means of braces 29, 30. The forward end of the conduit 27 terminates in a manifold 31 having a plurality of independent tubular portions 32 and this manifold may be supported in any desired or suitable manner, preferably by means of a support 33 which latter is removably or detachably secured preferably to the dash board 34 of the vehicle by means of any suitable fastening devices 35.

The separator proper 28 may be of any desired configuration but is preferably rectangular in shape, as shown more clearly in Fig. 3, the sides 36 of which are provided with diagonally disposed grooves or recesses 37 opening inwardly. The top of the separator is provided with an opening 38, through which a frame designated generally by the reference numeral 39 is adapted to be inserted. The sides 40 of the frame 39 enter the grooves or recesses 37 so that they will stand flush with the inner faces of the sides 36 of the separator. Supported by this frame are a plurality of flexible members 41 preferably in the form of wires arranged parallel with each other and extending diagonally across the frame, as shown more clearly in Fig. 2. The extremities of these wires are connected with turning plugs 42 arranged on opposite edges of the frame and by means of which the wires may be tightened. These flexible members or wires 41 may be spaced from each other any desired distance and any number may be employed, but they are preferably arranged close enough together to prevent the passage of seed cotton between the wires or through the separator screen thus formed, but are far enough apart to leave a sufficient space for the passage of the air currents. The lower extremity of the screen thus formed preferably projects below the bottom of the separator chamber 28 and is supported in any desired or suitable manner, preferably by means of a support 43. The separator chamber 28 is provided adjacent the lower end of the screen thus formed with an aperture or opening 44 through the bottom thereof and a casing 45 is supported in any suitable manner preferably by the lower face of the seprator chamber adjacent this opening 44 and has communication with the interior of the separator chamber in advance of the screen or the frame 39, so that the cotton will be conducted from the separator chamber 28 into the casing 45. The casing 45 is provided with the discharge outlet 46 which may be of any desired length and may be disposed at any angle, but preferably so as to be inclined downwardly. Pivotally supported at the forward end of this discharge outlet 46 is a spout having sides 48. When this spout 47 is in the position shown in Fig. 2, the cotton entering the casing 45 will be discharged through the outlet 46 and directed by the spout 47 into any suitable receptacle provided adjacent the spout for receiving the cotton.

In order to avoid spilling of the cotton or the discharge of the cotton through the outlet 46 when there is no receptacle or bag to receive the cotton, and during the brief interval of time necessary for changing the bags or receptacles, the spout 47 is adapted to be turned upon its pivot 49 into the position shown in dotted lines in Fig. 2 so as to close the outlet 46 and in order to hold the spout in a closed position, any suitable fastening devices may be provided such as catches 50 which are adapted to engage over projections 51 on the spout.

Arranged within the casing 45 is a rotatable member designated generally by the reference numeral 52 and is preferably in the form of a drum, the periphery of which is provided with outwardly opening recesses for the reception of blades or wings 53. These blades or wings may be constructed of any desired or suitable material but are preferably of some stiff but flexible material such as leather or the like and are of such a length as to form practically air tight connections with the wall of the casing 45 so that as the member 52 and the blades or wings 53 slowly revolve, the seed cotton will be discharged from the casing 45 through the spout 47. This member 52 and the blades 53 may be revolved either forwardly or backwardly but it is preferable to rotate the same in a forward direction so that the cotton will be discharged toward the driver's seat 21, thereby enabling the driven to attend to the filling of the receptacles without necessitating the stopping of the machine or of the driver leaving his seat.

Obviously if bags are employed to receive the cotton any convenient bag holder (not necessary to illustrate) may be provided.

The member 52 and the blades 53 may be rotated in any desired or suitable manner, but preferably from the shaft 26 of the motor 20. In order to transmit motion from this shaft, there is provided a countershaft 54 which is provided with a pulley 55 and an endless belt passes over this pulley 55 and also over a pulley 57 on the shaft 26. The shaft 54 is provided with a worm gear 58 which meshes with a gear 59 on a pulley 60 and an endless belt 61 passes over this pulley 60 and a pulley 62 which is secured to the axle of the member 52.

The cotton picker nozzles designated generally by the reference numeral 63 are connected to a flexible tubular member 64, preferably by means of a ball and socket connection designated generally by the reference numeral 65, whereby universal movement of the nozzle with respect to the tubular member 64 may be effected and a portion 66 of the nozzle is offset so as to readily adapt the nozzle to be presented in a proper position to the cotton boll. The extremity of each of the tubular members 64 is connected with one of the tubular portions 32 of the manifold 31 in any desired or suitable manner but preferably by means of the ordinary bayonet joint 67 by means of which the tubular members 64 may be readily attached or detached.

The nozzle proper or tip designated generally by the reference numeral 68 is preferably separate from the nozzle 63 and is adapted to be secured in position in any desired or suitable manner preferably by means of a screw threaded portion 69 adapted to engage with a similar portion of the body of the nozzle. The picking extremity of the nozzle 68 is provided with a plurality of inwardly projecting inclined teeth 70, which incline in a direction toward the center of the nozzle tip, thereby constituting an inwardly projecting toothed lip at the free extremity of the nozzle. By the provision of these teeth, any cotton which for any reason will cling to the boll so that it will not be removed by suction alone, may be readily removed owing to the fact that when the cotton is drawn into the nozzle by the suction and past the teeth 70, it cannot be withdrawn through the nozzle and all that is necessary after a portion of the cotton on the boll has passed these teeth is to move the nozzle with respect to the boll and the teeth will operate in a manner to forcibly remove the cotton from the boll and deliver it to the suction within the conduit. The cotton after it passes into the nozzle will be conveyed through the tubular member 64 to the manifold 31 and from there into the conduit 27 to be discharged from the conduit into the separator chamber 28. When the cotton enters this chamber 28 it will be still conveyed by the suction of the fan 24 so that it will strike or impinge the flexible members 41 of the separator frame 39. When the cotton is thus arrested by the screen the air will pass through the screen while the cotton will be deflected through the opening 44 into the casing 45 and the rotatable member 52 and blades 53 in the casing 45 will not only assist in drawing the cotton into the casing but will also actuate in a manner to discharge the cotton through the discharge outlet 46. It will be manifest that as the teeth 70 of the nozzle tip 68 slant inwardly they do not interfere with the cotton entering the nozzle but will operate immediately upon the cotton to prevent the latter from being drawn out of the nozzle after it has once passed the extremity of these teeth.

Having thus described my invention, what I claim as new and desire to secure by Letters Patent, is,—

1. In a cotton picking machine, the combination with a separator chamber having an inlet, an air outlet, and a cotton discharge outlet, of means for creating a suction through the separator chamber, a screen comprising parallel wires disposed across the separator chamber impinging the cotton, the cotton sliding on the wires to the lower end of the screen, the ends of the wires terminating adjacent the cotton discharge outlet, and a rotatable bladed member disposed in the cotton discharge outlet, the blades being adapted to contact with the lower end of the screen and to wipe material lodged against the screen from the screen, and to discharge it through the discharge opening.

2. In a cotton picking machine, a separating screen comprising parallel wires extending in one direction diagonally in the path of the cotton and inclined downwardly in the direction of the entering cotton, pneumatic means for forcing cotton against the screen and toward the bottom thereof, and a rotatable element having radially disposed flexible blades adapted to contact with the screen to wipe away cotton lodged against the screen.

3. In a cotton picking machine, the combination with a separator chamber of means for creating a suction through the chamber, a cotton discharge outlet at the bottom of the chamber, a screen consisting of wires disposed diagonally in the chamber and terminating at the side of the discharge opening opposite the inlet end of the chamber, a wiping device comprising a hub member with radially disposed blades spaced apart at their outer extremities and adapted to engage the lower extremities of the wires to wipe away cotton lodged against the lower end of the screen and to eject it from the discharge opening.

4. In a cotton picking machine, the combination with a separator chamber comprising an inlet opening, an air outlet opening, and a cotton discharge opening in the bottom thereof, a screen disposed diagonally across the chamber from a point adjacent the lower end of the opposite side of the discharge opening, a circular housing in connection with the discharge opening, a rotatable member disposed in the housing and having a plurality of spaced apart radially disposed flexible blades adapted to engage the lower extremity of the screen to wipe cotton therefrom into the said housing, the housing being formed with a discharge opening, and a spout to close the discharge opening at will.

5. A cotton picking machine comprising a separator chamber, a screen disposed therein embodying a plurality of flexible and parallel members extending in one direction from the top to the bottom of the separator chamber in the direction of movement of the cotton, means for tightening said members, and a wiping device comprising a rotatable member with flexible blades adapted to engage the members and move longitudinally in contact therewith to wipe material lodged against the bottom end of said members from contact therewith.

6. In a cotton picking machine, the combination with a separator chamber having an inlet, an air outlet, and a cotton discharge opening, of a screen comprising flexible parallel members disposed diagonally across the separator chamber from a point adjacent the inlet to the opposite side of the cotton discharge opening, means for tightening the separate wires, a housing substantially circular in cross section in connection with the separator chamber adjacent the cotton discharge opening and having a cotton discharge outlet opposite the discharge opening of the separating chamber, a rotatable hub member mounted in the housing, flexible blades radially disposed in the hub member, adapted to engage the circular edges of the housing and the lower extremities of the wires in the separator chamber whereby material lodged against the lower ends of the wires may be wiped therefrom into the housing and ejected from the discharge outlet of the housing, and an adjustable spout secured to the housing for closing the discharge outlet.

7. In a cotton picking machine, the combination with a separator chamber, of means for creating a suction through the chamber, a screen consisting of parallel members disposed diagonally in the chamber, a segmental cylindrical casing arranged substantially tangent to the screen and communicating with said chamber on the inlet side of the screen, and a rotatable element arranged concentric with the segmental casing and having radially disposed flexible blades forming in connection with the chamber a suction seal, said blades wiping the screen to dislodge the cotton therefrom and to carry it outward without opening the seal.

8. In a cotton picking machine, the combination of a separator member, means for creating a suction through the chamber, a screen consisting of parallel members disposed diagonally in the chamber lengthwise thereof between its inlet and outlet sides and having the under side thereof adjacent to the inlet side of the chamber, a cylindrical casing in communication at one side of its axis with said chamber at the inlet side of the screen and having a discharge opening at the opposite side of its axis, and a rotatable wiping device having blades concentric to the casing and forming in connection therewith a suction seal, the blades wiping the under side of the screen longitudinally thereof to dislodge cotton therefrom and carry it outward from the casing without breaking the seal.

9. In a cotton picking machine, the combination of a separator chamber, means for creating a suction through the chamber, a screen consisting of parallel bars extending lengthwise of the chamber and disposed diagonally across the chamber between the inlet and outlet ends thereof, a cylindrical casing in communication at one side of its axis with said chamber at the inlet side of the screen and having a discharge opening at the opposite side of its axis, and a rotatable wiping device arranged concentric with the casing and having radially disposed flexible blades for simultaneous coaction in sufficient number with opposite sides of the casing to maintain a permanent suction seal between the inlet and outlet openings of the casing when the device is rotated, said blades having wiping action at their outer edges with the screen to dislodge the cotton therefrom and to carry it outward through the casing without opening the seal.

In testimony whereof we have hereunto signed our names to this specification.

ALLEN P, TALLMAN,
M. A. LILES,
*Trustees of the Interstate Cotton Pickers, assignees of Eugene H. Schofield, deceased.*